United States Patent [19]

Whitney

[11] 3,710,033

[45] Jan. 9, 1973

[54] CALL FORWARDING ARRANGEMENT FOR TELEPHONE SYSTEMS

[76] Inventor: Wiley Whitney, 2829 N.E. 33rd Ct. Apt. 603, Fort Lauderdale, Fla. 33306

[22] Filed: June 11, 1971

[21] Appl. No.: 152,090

[52] U.S. Cl. ....................179/18 BE
[51] Int. Cl. ....................H04m 3/54
[58] Field of Search ....................179/18 BE

[56] References Cited

UNITED STATES PATENTS

| | | | |
|---|---|---|---|
| 3,573,389 | 4/1971 | Greenstein et al. | 179/18 AD |
| 3,544,729 | 12/1970 | Stevens | 179/18 BE |
| 3,479,464 | 11/1969 | Sitarik | 179/18 BE |

*Primary Examiner*—Thomas W. Brown
*Attorney*—Ivan A. McCorkendale

[57] ABSTRACT

A call forwarding arrangement, which is particularly applicable in connection with telephone exchanges having a relatively few call forwarding customers, utilizes a group of selectable call forwarding circuits together with selectable memory devices which are used only while the call forwarding line is in the transfer condition. A crossbar link circuit is utilized in conjunction with the group of selected call forwarding circuits, each call forwarding line having a vertical appearance on the crossbar switch of the link circuit while the call forwarding circuits of the group are connected to the horizontals. No modifications of the existing central office equipment are involved; all facilities of the CF service being added as auxiliary equipment.

12 Claims, 5 Drawing Figures

INVENTOR
WILEY WHITNEY
BY [signature]
ATTORNEY

CALL FORWARDING ARRANGEMENT FOR TELEPHONE SYSTEMS

My invention relates to a telephone switching system and, more particularly, to a call forwarding arrangement for telephone systems.

BACKGROUND OF THE INVENTION

In recent years there has become available to telephone subscribers in many areas a new high-speed telephone switching system known generally as Electronic Switching. One such system is described, for example, in Bell Laboratories Record, June 1965, published by Bell Telephone Laboratories Incorporated, Mountain Avenue, Murray Hill, New Jersey, 07974. Among the many operating advantages inherent in this type of switching system is the fact that it becomes feasible to provide a number of different special services to the customers; the need for these services have been generally recognized previously, but difficulties in providing them in connection with earlier types of switching systems have usually been controlling. A major factor in making such special services feasible in the instance of the new switching system referred to is the use of changeable stored programs or memories.

Among the various types of special services referred to above is automatic transfer, or call forwarding as it is now commonly designated. This service permits a subscriber who is going to be absent temporarily from his home or place of business to automatically reroute his incoming calls to another designated subscriber station. This rerouting step may include dialing a special "activate" code followed by dialing the number of the station to which the calls are to be transferred.

The demand on the part of telephone customers generally for call forwarding service, which has existed for some time in a somewhat dormant conditions, has, of course, been awakened and widened by the publicity attendant upon introduction of the new switching system referred to above. As a matter of fact, attempts have been made recently to provide call forwarding service on a limited basis to customers served by earlier types of telephone switching systems. However, due largely to the highly expensive equipment involved, it has not appeared feasible up to the present time to provide this service generally to customers served by other than electronic switching systems.

Accordingly, it is an object of my invention to improve and make economically feasible call forwarding service for telephone subscribers generally.

Another object of my invention is to provide on an economically feasible basis call forwarding service in telephone offices having only a relatively few call forwarding customers.

BRIEF DESCRIPTION OF THE INVENTION

In accordance with a specific illustrative embodiment of my invention, the call forwarding arrangement utilizes a group of selectable call forwarding circuits together with selectable memory devices which are used only while the call forwarding line is in the transfer condition. A crossbar link circuit is utilized in conjunction with the group of selectable call forwarding circuits, each call forwarding line having a vertical appearance on the crossbar switch of the link circuit, while the call forwarding circuits of the group are connected to the horizontals. Means are provided whereby a call forwarding circuit is selected and connected to the call forwarding subscriber's line on every originating call; at this time a call forwarding register is selected and connected to the call forwarding circuit. The circuit is then disconnected upon completion of dialing unless the call forwarding customer indicates by dialing the special activate code that he wishes to initiate a transfer. In the latter instance, the call forwarding register circuit registers all dial pulses and translates the special codes for transfer and cancellation of transfer. When a request for transfer is received, a call forwarding memory is selected and connected to the call forwarding circuit by means of a connector circuit. The register is released when the call forwarding subscribed disconnects after a transfer has been validated, but the memory remains connected until the transfer is cancelled.

A feature of the invention is a group of selectable call forwarding circuits together with selectable memory devices which are used only while the call forwarding line is in the transfer condition.

BRIEF DESCRIPTION OF THE DRAWING

A full understanding of the arrangement contemplated by the present invention as well as an appreciation of the various advantageous features thereof may be gained from consideration of the following detailed description in connection with the accompanying drawing in which.

GENERAL DESCRIPTION

Figure 1:
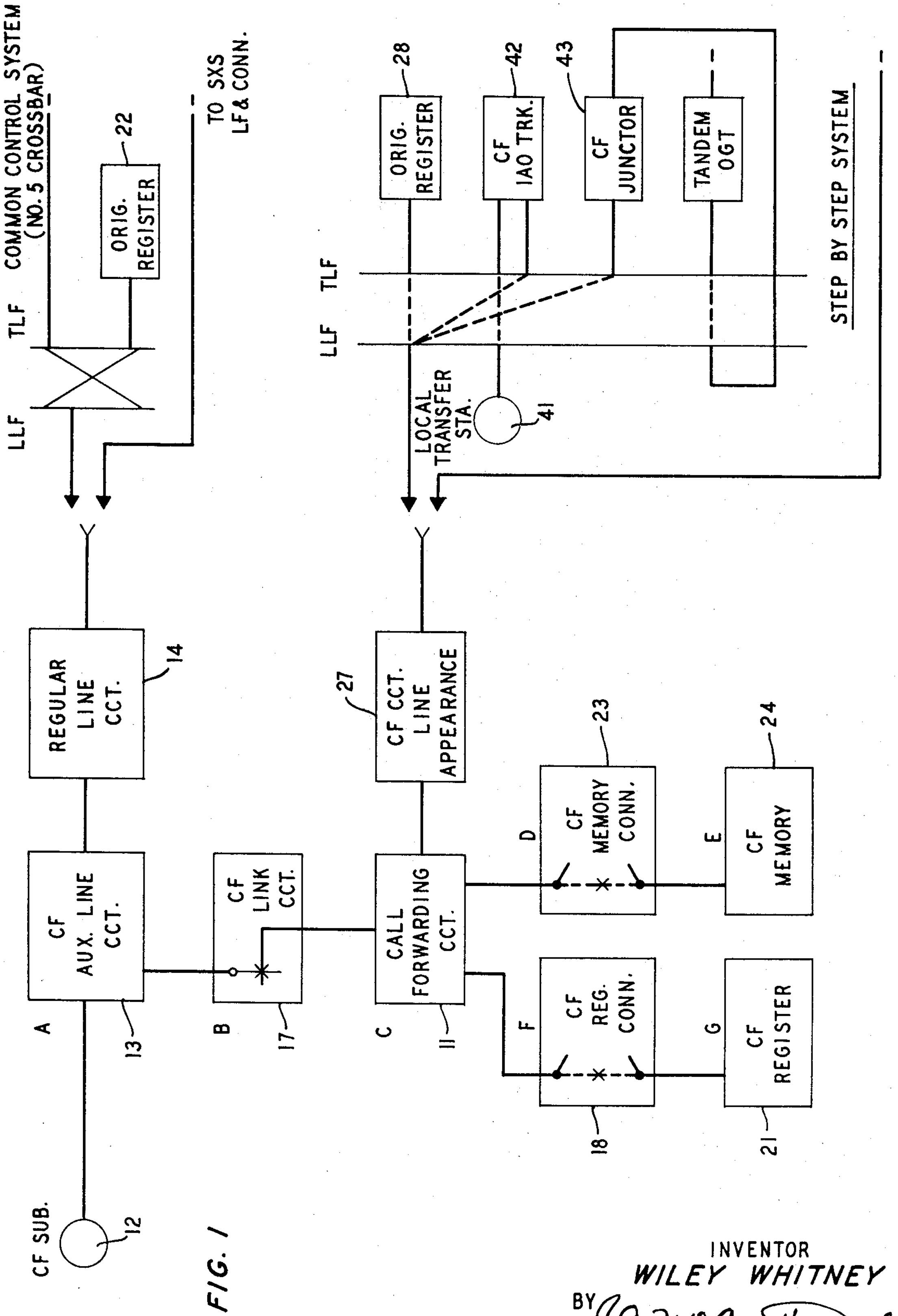
FIG. 1 shows schematically the manner in which the various elements of a call forwarding arrangement as contemplated by a specific illustrative embodiment of the invention may be associated one with the other and with other portions of the telephone system.

The nature and operation of the various components of the call forwarding arrangement as contemplated by a specific illustrative embodiment of my invention will be described in detail subsequently with particular reference to FIGS. 2 to 5 inclusive. However, in order to first gain a general overall understanding of the arrangement, a brief general description will be given at this point with particular reference to FIG. 1.

A common group of selectable call forwarding circuits 11 provides call forwarding service to call forwarding customers such as subscriber station 12. An auxiliary line circuit, as auxiliary line circuit 13, is provided for each CF subscriber. The auxiliary line circuit is connected between the subscriber's station and his regular line circuit 14 and, as indicated, is connected to a vertical of a call forwarding link circuit 17. When a call is initiated by station 12, and assuming a transfer has not been validated, link circuit 17 functions to connect the auxiliary line circuit 13 to a selected call forwarding circuit 11. Call forwarding circuit 11 activates CF register connector 18 to connect an idle CF register 21 through to the call forwarding circuit 11. As indicated, the call forwarding circuits are connected to horizontals of the CF link circuit 17. Call forwarding circuit 11 will now extend the dial tone request by station 12 through the regular line circuit 14, and originating register 22 is connected to his line in the usual manner.

Upon hearing dial tone, the CF subscriber dials the desired number, the digits being registered in originating register 22 in the usual manner. However, as will be described in detail subsequently with reference to FIGS. 2 and 3, a high impedance dial monitoring means included in call forwarding circuit 11 "follows" the dial pulses and causes them to be registered also in CF register 21.

Assuming first that a regular number (not a transfer) is dialed, the originating register will recognize "-completion of dialing" in the regular manner and will cause the connection to be completed to the desired number. When the normal call back function is initiated, call forwarding circuit 11 will recognize the momentary "open" and cause auxiliary line circuit 13 to cut through directly to the regular line circuit appearance, thereby releasing link circuit 17, call forwarding circuit 11, CF register connector 18 and CF register 21. It is apparent, therefore, that the holding times of the call forwarding circuit and associated register and connector are only the normal dialing time of the CF subscriber.

Assuming now for purposes of further description that the CF subscriber desired to initiate a transfer, he will then dial "90" (in the present illustrative embodiment) and await receipt of a distinctive "special" dial tone. In the event CF register 21 does not receive a third digit within a predetermined interval (4 seconds assumed in the present illustrative embodiment), it will recognize "90" as a request for a transfer. It will thereupon release the originating register which was connected to regular line circuit 14, restore its own digit registering relays to normal, and will cause call forwarding circuit 11 to disconnect the high impedance dial monitoring means referred to above and connect instead a low resistance pulsing and battery feed relay. At this point, the "special" dial tone will be transmitted to the CF subscriber at station 12.

Upon hearing the "special" dial tone, the CF subscriber proceeds to dial the number of the subscriber station to which he wishes to have his incoming calls transferred for a desired period of time. The CF register 21 upon recognizing completion of dialing will cause CF memory connector 23 to connect an idle CF memory 24 to CF circuit 11 and will cause the number stored in the digit register relays of CF register 21 to be transferred to CF memory 24. CF memory 24 now functions to cause call forwarding circuit 11 to initiate a dial tone request on the line circuit CF appearance 27 associated with CF circuit 11. After an originating register 28 has been connected to this line circuit, CF circuit 11 proceeds to pulse into it the transfer number stored in CF memory 24. When this pulsing has been completed and the regular switching equipment has established a connection to the transfer station 41, CF circuit 11 will complete a talking path between station 41 and CF subscriber station 12 and the CF subscriber will then hear the audible ringing tone.

Upon response by transfer station 41, the CF subscriber can determine by inquiry whether the proper number has been stored and, if so, can inform the transfer station subscriber that his incoming calls will be transferred to that station for the present. Upon disconnect by the CF subscriber, the transfer becomes validated and future calls to station 12 will be diverted by CF circuit 11 to transfer station 41 so long as the validated period continues. CF register 21 is released during this time but CF circuit 11 and CF memory 24 are held. Of course, in the above instance had the CF subscriber found that the number reached was not actually the desired transfer number, he would immediately cancel the transfer in the manner subsequently described.

In the above instance, in the event transfer station 41 does not answer, the transfer number will remain stored in CF memory 24 for 2 minutes and the CF subscriber at station 12 may, if he wishes, validate the transfer by dialing 90, waiting for dial ton and then again dialing the transfer number before expiration of the two minute period. In this instance, CF register 21 is reconnected to CF circuit 11 and, when dialing is completed, the number registered in CF register 21 is compared with the number stored in CF memory 24. If there be a match of the two numbers, the CF subscriber receives an "OK" tone and upon his going on-hook the transfer is validated and CF register 21 is released. On the other hand, if there is a failure of the numbers to match, the CF subscriber receives a "reorder" tone and upon his going on-hook all circuits will restore to normal.

The CF subscriber can originate calls even while a transfer is validated so long as a transfer call is not actually in progress; the connection will be established via his regular line circuit 14.

In order to cancel a validated transfer, the CF subscriber simply dials "91" and awaits the "OK" tone. Upon receipt of the tone, he goes on-hook and all circuits restore to normal.

When an incoming call is received via regular line circuit 14 of CF station 12 while a transfer is validated, call forwarding circuit 11 causes a dial tone request to be initiated on the associated CF line circuit appearance 27. Upon attachment of originating register 28 CF circuit 11 proceeds to pulse out the transfer number stored in CF memory 24. When pulsing has been completed and a connection established to transfer station 41, CF circuit 11 closes a transmission path between line circuit 14 and line circuit appearance 27 so that the calling party is able to containing the audible ringing tone.

Upon answer by transfer station 41 supervision is returned to the calling end and the calling party will be charged for a call to CF station 12. To facilitate the charging procedure, the connection is preferably completed via separate groups of CF trunks 42 or CF junctors 43 which are selected by means of a distinctive class-of-service indication for line appearance 27.

Upon completion of the transferred call and return to on-hook condition at transfer station 41, the circuits will restore to the normal "transfer validated" condition with CF auxiliary line circuit 13, CF link circuit 17, call forwarding circuit 11, CF memory connector 23 and CF memory 24 still held.

It will be readily apparent from the above general description of a specific illustrative embodiment of the invention that effective and efficient means are provided for furnishing call forwarding service to subscribers in an economically feasible manner particularly in instances where a particular exchange has only a relatively few call forwarding subscribers. Particularly attractive economic features are inherent in the arrangement since the call forwarding circuits and call forwarding memories are selectable on a preference basis from a relatively small group and are held only during the time the call forwarding line is actually in the transfer mode. Substantially no modification of existing central office equipment is required, and in the case of normal, i.e. non-transfer, calls, the holding times for the selected call forwarding circuit and associated register and connector are only the normal dialing time of the CF subscriber.

DETAILED DESCRIPTION OF THE INVENTION

Figure 2:
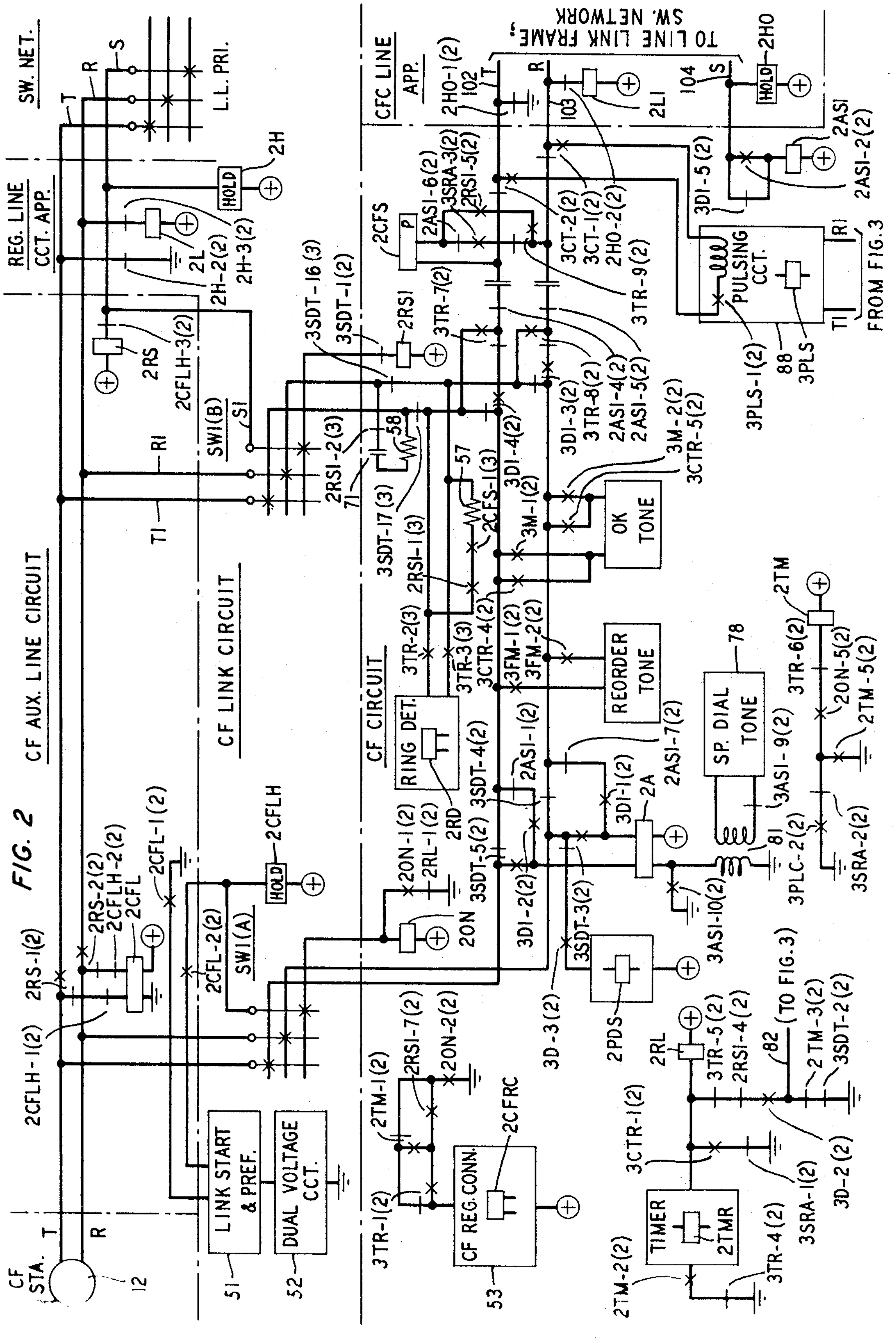
FIG. 2 shows schematically a subscriber's call forwarding auxiliary line circuit, call forwarding link and call forwarding circuit.
Figure 3:
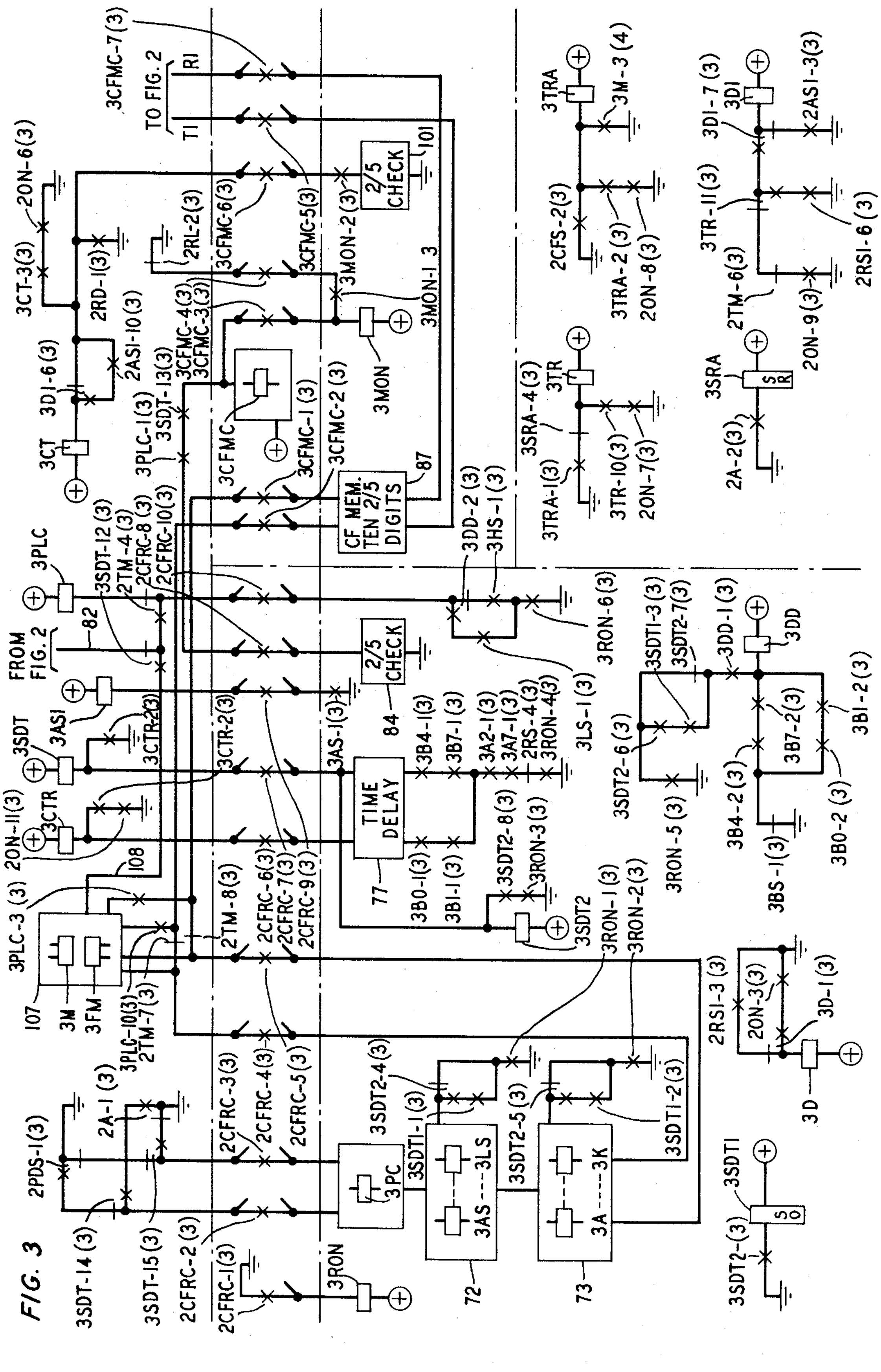
FIG. 3 shows schematically portions of the call forwarding register, call forwarding memory and call forwarding memory connector together with several miscellaneous relay circuits.
Figures 4, 5:
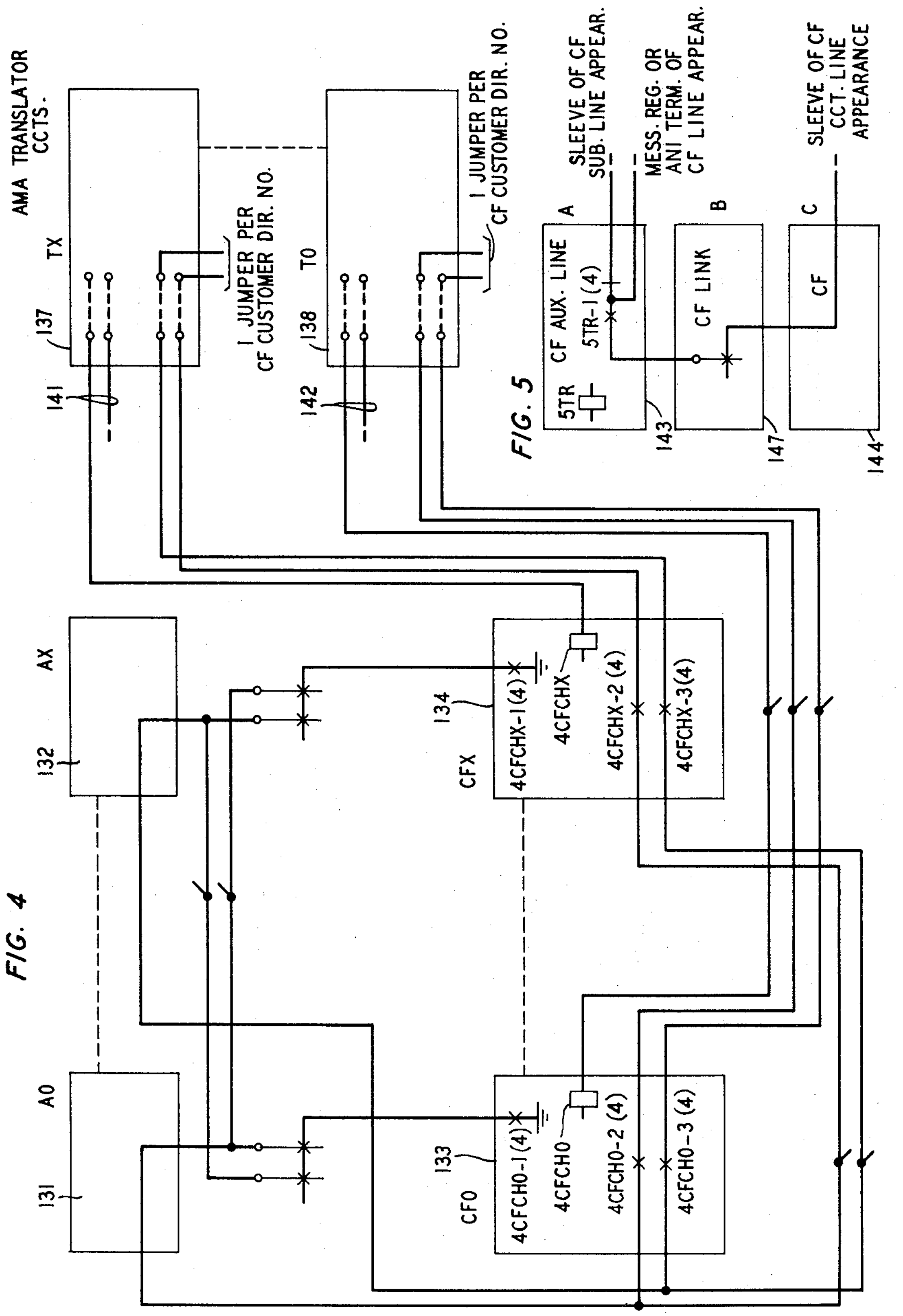
FIG. 4 shows schematically circuit elements involved in call forwarding charges in the instance of one type of telephone office.
FIG. 5 shows schematically circuit elements involved in call forwarding charges in the instance of another type of telephone office.

Coming now to a detailed description of the invention, there is shown in FIGS. 2 and 3 particularly a call forwarding arrangement as contemplated by a specific illustrative embodiment of the invention. In the detailed figures of the drawing, the circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding is preceded by a numeral indicating the figure of the drawing in which the apparatus appears, for example, the winding of relay 2PDS which appears in FIG. 2. Further, each contact designation is followed by a numeral in parenthesis which indicates the figure of the drawing in which the contact appears, for example, the designation "2PDS–1(3)" which indicates that contact No. 1 of relay 2PDS appears in FIG. 3 while, as indicated by the designation "2PDS," the relay winding appears in FIG. 2. In accord with usual circuit design, transfer contacts may be either Early Make-Break (continuity) or Early Break-Make (sequence transfer) as dictated by the particular operational requirements.

Subscriber Dials "90" For Transfer Initiation

For purposes of description, it will be assumed first that the CF subscriber at station 12 desires to set up a transfer condition and goes off-hook for initiating the call. With station 12 off-hook, a path is closed for operation of relay 2CFL from ground, left winding of relay, break contact 2CFLH–1(2), break contact of transfer pair 2RS–1(2), closed station loop, break contact of transfer pair 2RS–2(2), break contact 2CFLH–2(2), right winding of relay to battery.

Relay 2CFL, upon operating, closes at make contact 2CFL–1(2) a path for activating link start and preference circuit 51 whereby to operate crossbar switch SW1(A and B) and select an idle CF circuit. (For purposes of simplication, only one CF circuit is shown but it will be understood that a group of similar circuits is provided of a size commensurate with the normal expected demand and, further, that the circuits are selected on a preference basis in a manner well understood in the telephone switching art.) Relay 2CFL, operated, also closes at make contact 2CFL–2(2) a path for operating HOLD magnet 2CFLH from dual voltage circuit 52.

Operation of switch S.W.1 closes the crosspoints between the CF auxiliary line circuit and the call forwarding circuit as selected relay 20N operates over this closed path and, upon operating, locks to ground through its make contact 2ON–1(2) and break contact 2RL–1(2). This same ground path acts to hold magnet 2CFLH operated after link start and preference circuit 51 has released. Operating of HOLD magnet, or rely, 2CFLH opens the path connecting the windings of relay 2CFL to the line at respective break contacts 2CFLH–1(2) and 2CFLH–2(2), and opens the operate path of relay 2RS at break contact 2CFLH–3(2). Relay 2CFL releases and opens at make contact 2CFL–2(2) the operate path of HOLD magnet 2CFLH and opens at make contact 2CFL–1(2) the activating path of link start and circuit 51; HOLD magnet 2CFLH holds operated from ground at make contact 20N–1(2).

Relay 20N, operated, also closes a path for activation of CF register connector 53 from ground, make contact 20N–2(2) and respective break contacts of transfer pairs 2TM–1(2) and 3TR–1(2). Operation of relay 3RON follows from ground through make contact 2CFRC–1(3).

Operation of crossbar switch SW1 as described above closes a bridge from CF station 12, crosspoints of SW–1A, CF circuit, crosspoints of SW–1B, to the regular line circuit appearance of the CF station. Line relay 2L now operates from battery, break contact 2H–3(2) switch SW1(B), the CF circuit, line bridge, switch SW1(B), break contact 2H–2(2) to ground. With line relay 2L operated, the line is now connected through the regular switching network to an originating register and dial tone is supplied to station 12. HOLD relay 2H operates following closure of the line bridge as mentioned above.

Also, relay 2H, operated as above described, interrupts at break contacts 2H–2(2) and 2H–3(2) the operate path of relay 2L whereby to release that relay. Relay 2H holds to ground on the sleeve (S) lead and relay 2RS1 operates from this same ground via break contact 3SDT–1(2). Relay 2RS1, operated, partially closes at make contact 2RS1–1(3) a path for connecting terminal resistor 57 across the line appearance via Sw–1B, and interrupts at break contact 2RS1–2(3) the path previously connecting resistor 58 across the line appearance through capacitor 71. Also, relay 2RS1 operated closes at make contact 2RS1–3(3) an operate path for relay 3D, (a relay included in the CF circuit) which upon operating locks to ground through the make contact of its transfer pair 3D–1(3) and make contact 20N–3(3); the previous operate path is opened at the break contact of the same transfer pair. (Transfer pair 3D–1(3) is Make-before-Break.) Relay 3D, operated, partially closes at make contact 3D–2(2) an operate path for relay 2RL and closes at make contact 3D–3(2) an operate path for relay 2PDS, the high impedance pulse detector. Relay 2PDS, operated, closes at make contact 2PDS–1(3) a path through the break contact of transfer pair 3SDT–14(3) and make contact 2CFRC–2(3) for operating pulse counter relay 3PC.

The high impedance pulse detector referred to above is of a general type commonly used for service observing Found: telephone switching exchanges; it will be recalled that in the preceding general description of the arrangement, reference was make to the connection of this monitoring means which "follows" the dial pulses and causes them to activate a pulse counter (3PC). Since, as stated, the pulse detector is given a high impedance characteristic, it can be connected in the circuit as described without undesirably affecting the normal operations of the system.

As the subscriber dials, after receiving dial tone as above described, the pulses are registered in the normal manner in the originating register at the switching exchange. It will be recalled that it is being assumed in the first instance that "90" is being dialed in order to set up a transfer.

Digit steering relays 3AS–3LS (box 72) and 2/5 digit registers 3A-3K (box 73) operate in a manner well understood in the switching art and their operation will not be described in detail in this connection. Detailed description of generally similar steering and registering circuits may be found, for example, in U.S. Pat. No. 3,125,642 issued Mar. 17, 1964 to L. T. Anderson et. al., U.S. Pat. No. 3,151,220 issued Sept. 29, 1964 to P. H. Arnold et al., and U.S. Pat. No. 3,488,448 issued Jan. 6, 1970 to V. J. Acquaviva.

Also, as the number "90" is dialed, the digit "9" on the A digit register of digit register 73 causes operation of register relays 3A2 and 3A7 and the digit "0" on the B digit register of digit register 73 causes operation of register relays 3B4 and 3B7.

It will be recalled that it was pointed out above in the general description of the circuitry that in the event the CF register does not receive a third digit within a predetermined interval, assumed to be 4 seconds, it will recognize the "90" as a request for a transfer. At this point, 4-second time delay device 77 is activated and, after a 4-second delay, relay 3SDT is operated from ground, make contact 3RON–4(3), break contact 2RS–4(3), make contacts 3A7–1(3), 3A2–1(3), 3B7–1(3, 3B4–1(3), 2CFRC–7(3), winding of relay 3SDT to battery. Relay 3SDT2 also operates over a portion of the path just traced and, upon operating, locks through its make contact 3SDT2–8(3) to ground at make contact 3RON–3(3). Following operation of relay 3SDT2, slow-operate relay 3SDT1 operates to ground at make contact 3SDT2–1(3); this operation is delayed slightly by the slow-operate characteristics of the relay. Before relay 3SDT1 has fully operated, steering relays 3AS and 3BS and digit register relays 3A2, 3A7, 3B4, and 3B7 release as the respective ground paths are opened at the break contacts of transfer pairs 3SDT2–4(3) and 3SDT2–5(3); upon operation of relay 3SDT1 locking paths to ground for the steering and register relays are closed through make contacts 3SDT1–1(3) and 3SDT1–2(3). Also, before relay 3SDT1 has fully operated; relay 3DD releases as the operate path is opened at make contacts 3B4–2(3) and 3B7–2(3 and the locking path is opened at break contact 3SDT2–7(3).

Relay 3SDT, operated as above described, opens at break contact 3SDT–2(2) the operate path of release relay 2RL, disconnects at the break contacts of respective transfer pairs 3SDT–14(3) and 3SDT–15(3) the 2PDS–1(3) transfer pair contacts from the pulse counter 3PC and connects at the make contacts of the same two transfer pairs the 2A–1(3) transfer pair contacts to the pulse counter, releases the pulse detector 2PDS by interrupting the activating path at the break contact of transfer pair 3SDT–3(2), closes an operate path for relay 2A at the make contact of the same transfer pair, and opens at break contact 3SDT–1(2) the operate path of relay 2RS1, which relay releases and recloses at break contact 2RS1–2(3) the path connecting resistor 58 across the regular line appearance. Also, with relay 3SDT operated, the path through the line to the originating register is opened at the break contact of transfer pair 3SDT–5(2) and at break contact 3SDT–4(2) and the originating register releases.

The "special" dial tone from source 78 is now applied through transformer 81 to the tip (T) side of the line through the left winding of relay 2A and the make contact of transfer pair 3SDT–5(2), through the station loop at station 12, to the ring (R) side of the line, make contact of transfer pair 3SDT–3(2), right winding of relay 2A to battery. Upon hearing this special tone, the subscriber at station 12 proceeds to dial the number of the subscriber's station to which he wishes to have his incoming calls transferred for a desired period of time.

It will be noted that at this time, the high impedance dial monitoring means, 2PDS, has been disconnected from the line and that there has been connected thereto instead of low resistance pulsing and battery feed relay, relay 2A. It will be recalled also that the 2PDS–1(3) transfer pair contacts have been disconnected from the pulse counter 3PC and that the 2A–1(3) transfer pair contacts have been connected thereto.

As the subscriber now dials the transfer number, relay 2A "follows" the dial pulses. As relay 2A operates, the pulses are applied to pulse counter 3PC over a path closed at the make contact of transfer pair 2A–1(3), the make contact of transfer pair 3SDT–14(3), and make contact 2CFRC–2(3). The first digit operates steering relay 3AS; operation of relay 3AS1 follows from ground at make contact 3AS–1(3) and make contact 2CFRC–9(3). With relay 3AS1 operated, the special dial tone is disconnected at break contact 3AS1–9(2) and the holding ground for relay 2A is connected through make contact 3AS1–10(2).

Returning now to operation of relay 2A in step with the dialed digits, the steering relays 3AS–3LS and the digit registering relays 3A–3K operate in accord with the transfer number dialed. Relay 3SRA operates to ground at make contact 2A–2(3); relay 3SRA has a slow-to-release characteristic and holds operated on the dial pulses. Relay 3SRA, operated, partially closes at make contact 3SRA–3(2) a bridge across the line through the winding of relay 2CFS.

As steering relays 3AS–3LS and digit register relays 3A–3K operate, the digits of the transfer number are stored in register 73 (digit register relays 3A–3K). Following operation of the "last" steering relay, 3LS, "-pulsing complete" relay 3PLC operates from ground at make contact 3RON–6(3), make contact 3LS–1(3), make contact of transfer pair 3DD–2(3) make contact 2CFRC–10(3) and break contact of transfer pair 2TM–4(3). [This operate path prevails in the instance of a 10-digit number in which event steering relay 3LS and relay 3DD are operated. In the event of a 7-digit number with steering relay 3HS operated and "distant dialing" relay 3DD released, the initial part of the operate path for relay 3PLC is closed through make contact 3HS–1(3) and the break contact of transfer pair 3DD–2(3).]

Call forwarding memory connector 3CFMC now operates from ground through 2/5 check circuit 84, make contact 2CFRC–8(3), 3PLC–1(3), 3SDT–13(3), relay 3CFMC to battery; relay 3CFMC, upon operating, closes at make contact 3CFMC–3(3) an operate path for relay 3MON. Relay 3MON operates and locks to ground through make contacts 3MON–1(3), 3CFMC–4(3) and break contact 2RL–2(3).

Relay 3CFMC, operated, closes at make contacts 3CFMC–2(3) and 3CFMC–1(3) a path for selecting an idle call forwarding memory 87, and closes at make contacts 3CFMC–5(3) and 3CFMC–7(3) a path connecting the selected memory to pulsing circuit 88, (3PLS). Also, paths are closed at this time through make contact 2CFRC–4(3), break contact 2TM–7(3) and make contact 3CFMC–2(3) and through make contact 2CFRC–5(3), break contact 2TM–8(3) and make contact 3CFMC–1(3) for transfer of the digit information stored in the digit relays of register 73 to the selected call forwarding memory. These two paths, shown for purposes of simplicity and clarity of the drawing as single leads, actually represent 50 separate leads as required for transmission of 10 digits on a 2/5 basis.

Cut-through relay 3CT operates, following operation of relay 3MON as described above, from ground at 2/5 check circuit 101, make contacts 3MON–2(3), 3CFMC–6(3), and break contact of transfer pair 3D1–6(3; relay 3CT upon operating locks to ground at make contact 3ON–6(3) through its own make contact 3CT–3(3). With relay 3CT operated, the pulsing circuit 3PLS is closed through to the call forwarding line at the make contacts of respective transfer pairs 3CT–2(2) and 3CT–1(2).

Line relay 2L1 operates over the loop closed through pulsing circuit 2PLS and this is followed in the normal manner by connection of an originating register to the call forwarding line circuit (Tip 102 and ring 103). HOLD relay 2HO now operates from ground on sleeve lead 104 and this is followed by release of relay 2L1 as the operate path is open at break contacts 2HO–1(2) and 2HO–2(2).

Auxiliary sleeve relay 2AS1 also operates at this time from the ground on sleeve lead 104 and closes an alternate holding path at its make contact 2AS1–2(2) which is independent of the path through break contact 3D1–5(2. Also relay 2AS1, operated, opens at break contacts 2AS1–4(2) and 2AS1–5(2) the future talking path for the CF subscriber to the transfer station and opens at break contact 2AS1–6(2) the future supervisory bridge through the winding of relay 2CFS.

Relay 3D1 operates following operation of relay 2AS1 as just described from ground at make contact 2AS1–3(3 and the break contact of its transfer pair 3D1–7(3 and immediately upon operating closes a hold path to ground through the make contact of its transfer pair 3D1–7(3), break contacts 3TR–11(3) and 2TM–6(3) and make contact 2ON–9(3). (Transfer pair 3D1–7(3) is Make-Before-Break.) Relay 3D1, operated, partially closes at the make contacts of respective transfer pairs 3D1–4(2) and 3D1–3(2) the talking path for the CF subscriber at station 12, opens at break contact 3D1–5(2) the operate path of relay 2AS1 [held through make contact 2AS1–2(2)], and opens at the break contact of transfer pair 3D1–6(3) the operate path of relay 3CT which is held through make contact 2AS1–10(3).

As the transfer number stored in the CF memory is pulsed by pulsing circuit 3PLS, the marker at the switching office functions in its normal manner and either a CF 1AO trunk (42, FIG. 1) or aCF junctor (43) is selected in accord with the class of service mark on the CF line circuit, The transfer station is rung in the normal manner.

Following normal call back functions at the switching terminal, auxiliary line relay 2AS1 releases upon removal of ground at the sleeve connection. Release of relay 3CT follows as the holding path to ground is open at make contact 2AS1–10(3); the operate path is already open at the break contact of transfer pair 3D1–6(3). Pulsing circuit 88 (3PLS) is now restored to normal as the line connection is opened at the make contacts of respective transfer pairs 3CT–1(2) and 3CT–2(2).

A supervisory bridge through the winding of relay 2CFS is now connected to the transfer station through the break contact of transfer pair 3TR–9(2), make contact 3SRA–3(2) and break contact 2AS1–6(2).

With relays 2AS1 and 3CT now released, a path between the transfer station and station 12 is closed at the make contacts of respective transfer pairs 3D1–4(2 and 3D1–3(2); the subscriber at station 12 hears audible ringing tone. The connection is held to ground at make contacts of relay 20N.

Upon response by the transfer station, relay 2CFS (polarized) operates upon the battery reversal (supervision) from the 1AO trunk or the junctor involved in the connection. Relay 3TRA operates from ground at make contact 2CFS–2(3) and, upon operating, locks through its make contact 3TRA–2(3) to ground at make contact 20N–8(3).

The CF subscriber at station 12 may now determine by conversation with the subscriber at the transfer station whether the proper number has been stored in the CF memory; in other words, whether the desired transfer station has, in fact, been called.

Assuming that the proper transfer station has been connected, the CF subscriber needs only to disconnect in order to validate the transfer. Upon his disconnect, relay 2A releases as the station loop is opened. After a slight interval determined by the slow release characteristic of relay 3SRA, this relay releases as the operate path is open at make contact 2A–2(3). The bridge to the transfer station through the winding of relay 2CFS is now opened at make contact 3SRA–3(2). HOLD relay 2HO releases and line relay 2L1 is reconnected across the CF line at break contacts 2HO–1(2) and 2HO–2(2).

Following full release of relay 3SRA, relay 3TR operates from ground through make contact 3TRA–1(3) and break contact 3SRA–4(3) and the transfer is validated; upon operating, relay 3TR locks to ground through its make contact 3TR–10(3) and make contact 20N–7(3). CF register connector 2CFRC now releases as the operate path is open at the break contact of transfer pair 3TR–1(2). Also, relay 3TR, operated, opens at break contact 3TR–5(2) the operate path of release relay 2RL and opens at the break contact of transfer pair 3TR–11(3) the holding path of relay 3D1 which releases.

With register connector 2CFRC released, relay 3AS1 releases as the operate path is open at make contact 2CFRC–9(3). Also, "pulse complete" relay 3PLC is released as the operate path is open at make contact 2CFRC–10(3) and "second dial tone" relay 3SDT is released as the operate path is open at make contact 2CFRC–7(3).

Register off-normal relay 3RON releases following release of relay 2CFRC as discussed above, the operate path being opened at make contact 2CFRC–1(3). The steering relays 72 and the digit register relays 73 return to normal as the respective holding grounds are removed at make contacts 3RON–1(3) and 3RON–2(3) and the CF register is normal. Relay 3SDT releases as the operate path is open at make contact 2CFRC–7(3). Relay 3SDT2 releases as the holding ground is removed at make contact 3RON–3(3) and relay 3SDT1 releases as the operate path is open at make contact 3SDT2–(3).

CF station 12 is at this time connected to the regular line appearance through the CF link and CF circuit; relays 20N, 3D, 3TR, 3MON and 3CFMC are operated. That is, while the CF register has been released, the CF circuit and the CF memory remain held.

It will be noted that the originating register connection is not held during the entire time a transfer is being established; if the connection were held "double connections" to the register could result. The regular line appearance is permitted to return to an "idle" condition and the line is open at break contacts 3SDT–16(3) and 3SDT–17(3). An incoming call, while not barred, will result merely in a "Ringing-Don't Answer" condition.

Transfer Not Validated, Subscriber Again Dials "90" Within 2-Minute Interval

As pointed out above in connection with the general description of the circuitry, in the event the transfer station does not answer, the transfer number remains stored in the CF memory for a predetermined interval, here assumed to be 2 minutes, and the CF subscriber may, if he so desires, still validate the transfer by again dialing "90," awaiting dial tone, and then again dialing the transfer number all before expiration of the 2-minute interval referred to.

It will be assumed, therefore, for purposes of further description, that the transfer subscriber did not respond to the above described call initiated by dialing "90" followed by dialing the transfer number.

Upon the subscriber station 12 going on-hook, relay 2A releases as the line is open at the station loop. Relay 3SRA releases, following an interval determined by the slow-release characteristic of the relay, as the operate path is open at make contact 2A–2(3). Other operations follow as described previously in the instance of going on-hook; these functions include opening of the bridge through relay 2CFS and the release of the connection to the transfer station.

Relay 2TM operates from ground at make contact 3PLC–2(2), break contact 3SRA–2(2), make contact 2ON–5(2) and break contact 3TR–6(2); relay 2TM operates and locks to ground at make contact 2TM–5(2). With relay 2TM operated, the operate path of relay 2RL is opened at the break contact 2TM–3(2).

Relay 3D1 now releases as the holding path is opened at the break contact 2TM–6(3) and relay 2CFRC releases as the holding path is interrupted at the break contact of transfer pair 2TM–1(2). With relay 2TM operated, a path is now closed at make contact 2TM–2(2) for activating the 2-minute timer 2TMR; relay 2RL operates at the end of the 2-minute interval to ground at the timer. Relay 2RL, operated, releases relay 20n and HOLD Magnet 2CFLH as the holding path is open at break contact 2RL–1(2). This releases all other operated relays and restores all circuits to normal.

It will be assumed now that, before the expiration of the 2-minute interval as in the situation immediately above, the CF subscriber had initiated a new call; relays 20N, 2TM, and 3D would not yet have been released. Line relay 2L will operate and the normal marker functions will follow. Relay 2H operates from ground on the sleeve lead. As before, the originating register is connected to the CF station for recording dial pulses. Following operation of relays 2RS1 and 2CFRC, the CF register is reconnected to the CF circuit for recording the dial pulses from station 12.

Now as the CF subscriber dials "90" for a transfer, "9" will be registered in the A digit register and "0" will be registered in the B digit register. After a 4-second delay by time delay device 77, relay 3SDT will operate over a path previously described as will relay 3SDT2; relay 3SDT2 upon operating, locks through its make contact 3SDT2–8(3) to ground at make contact 3RON–3(3). Relay 3SDT1 operates following operation of relay 3SDT2 to ground at make contact 3SDT2–1(3), this operation being delayed for an interval due to the slow-operate characteristic of the relay. Before expiration of this interval, the steering and digit register relays, release; following operation of relay 3SDT1 holding ground for the steering relays is connected via the make contact of transfer pair 3SDT2–4(3) and make contacts 3SDT1–1(3) and 3RON–1(3) and holding ground for the digit register relays is connected via the make contact of transfer pair 3SDT2–5(3) and make contacts 3SDT1–2(3) and 3RON–2(3).

Operations similar to those described in detail with regard to the previous dialing of "90" take place including release of the originating register, connection to the CF line of relay 2A and transmission of the "special" dial tone to the CF station. The CF subscriber dials the transfer number as before.

With relays operated as previously described, the number information stored in CF register 73 and the number information stored in CF memory 87 are applied to matching circuit 107 for comparison and indication of a "match" if the two sets of information are, in fact, identical. Matching circuit 107 is activated at this time from ground at make contact 3RON–6(3), either make contact 3LS–1(3) and make contact of transfer pair 3DD–2(3) or make contact 3HS–1(3) and break contact of transfer pair 3DD–2(3) depending upon the number dialed, make contact 2CFRC–10(3), make contacts of transfer pairs 2TM–4(3) and 3SDT–12(3), lead 108 to battery at the matching circuit. Match circuit 107 may be any one of several different types of circuits known in the art which function to compare two sets of information for indication either of a "match" or a "mismatch." One type of matching circuit is disclosed, for example, in U.S. Pat. No. 3,261,111 issued July 19, 1966 to D. F. Johnston et. al. In the present instance, when a match exists between the two sets of information, relay 3M operates and the "OK"tone is applied to the CF circuit through make contacts 3M–1(2) and 3M–2(2). On the other hand, if there be a failure to match, relay 3FM will operate and "reorder" tone will be applied to the CF circuit through make contacts 3FM–1(2) and 3FM–2(2). Accordingly, at this point either an "OK" tone or a "reorder" tone will be applied to the CF circuit and transmitted to the CF subscriber at station 12.

Assuming first that there is a match, relay 3M operates and closes a connection to the CF circuit at make contacts 3M–1(2) and 3M–2(2); "OK" tone is supplied to station 12. Relay 3TRA operates to ground at make contact 3M–3(4) and, upon operating, locks through its make contact 3TRA–2(3) to ground at make contact 2ON–8(3). The subscriber at station 12, upon hearing the "OK" tone, goes on-hook and relay 2A releases; this is followed after a brief delay by release of relay 3SRA as the operate path is open at make contact 2A–2(3). Relay 3TR now operates to ground through break contact 3SRA–4(3) and make contact 3TRA–1(3) and, upon operating, locks to ground at make contact 2ON–7(3) through its make contact 3TR–10(3). The transfer is now validated even through there was no response to the call by the transfer station.

With relay 3TR operated, 2-minute timer 2TMR is deactivated as the energizing path is open at break contact 3TR–4(2), the operate path of release relay 2RL is open at break contact 3TR–5(2), register connector 2CFRC is released as the operate path is open at the break contact of transfer pair 3TR–1(2), and relay 2TM is released as the hold path is open at break contact 3TR–6(2). Release of relay 2TM is followed by deactivation of matching circuit 107 as the energizing path is open at make contact of transfer pair 2TM–4(3).

Release of relay 2CFRC is followed by release of relay 3RON and the CF steering and register relays as previously described; relays 3SDT, 3SDT1 and 3SDT2 also release. Station 12 is connected to the regular line appearance through the CF link and CF circuit; relays 2ON, 3TRA, 3TR, 3D remain operated.

In case of a "mismatch" and transmission of "reorder" tone to station 12, relay 3TRA is not operated and all circuits return to normal after the CF subscriber goes on-hook. In the event of a mismatch, relay 3FM of the matching circuit 107 operates and the "reorder" tone is connected to the CF circuit through make contacts 3FM–1(2) and 3FM–2(2).

CF Subscriber Dials "91" To Cancel Transfer

Assuming now that the CF subscriber at station 12 wishes to cancel the previously validated transfer and dials "91" for this purpose, "9" is stored on A digit register by operation of relays 3A2 and 3A7, and "1" is stored on B digit register by operation of relays 3BO and 3B1. "Cancel transfer" relay 3CTR operates, after a slight delay by 4-second timer 77, from ground at make contact 3RON–4(3), break contact 2RS–4(3), make contacts 3A7–1(3), 3A2–1(3), 3B1–1(3), 3B0–1(3, and 2CFRC–6(3); upon operating, relay 3CTR locks to ground at make contact 2ON–11(3) through its own make contact 3CTR–2(3). "OK" tone is now connected to the line via make contacts 3CTR–4(2) and 3CTR–5(2) for transmission to the CF subscriber at station 12.

Relay 3SDT now operates from ground at make contact 3CTR–2(3), and relay 3SDT2 operates from this ground ground through make contact 2CFRC–7(3). Relay 3SDT1 operates from ground at make contact 3SDT2–1(3). Relay 2A is now connected to the line through the make contacts of respective transfer pairs 3SDT–5(2) and 3SDT–3(2) and this relay operates. This is followed by operation of relay 3SRA to ground at make contact 2A–2(3).

With relay 3SDT operated, the operate path of release relay 2RL is open at break contact 3SDT–2(2), the 2PDS contacts are disconnected from pulse counter 3PC at the break contact of transfer pair 3SDT–14(3) and the 2A contacts are connected thereto via the make contact of the same transfer pair, pulse detector 2PDS is disconnected from the line at the break contact of transfer pair 3SDT–3(2), the path to the originating register is opened at break contact 3SDT–4(2) and the originating register releases and relay 2RS1 is released as the holding path is open at break contact 3SDT–1(2).

With relay 2RS1 released, terminating resistor 58 is reconnected across the line appearance at break contact 2RS1–2(3), and register connector 2CFRC is released as the operate path is open at make contact 2RS1–7(2. Relay 3RON releases as the operate path is open at make contact 2CFRC–1(3) and this is followed by release of relays 2SDT2, 3SDT1, relay 3DD and the CF steering and digit register relays. Relays 2ON, 3TR, 3TRA, 3D, 3MON, 3CFMC, 2A, 3CTR, 3SDT and 3SRA remain operated.

Now when the CF subscriber at station 12, having received the "OK" tone, goes on-hook, relay 2A releases and this is followed by release after a short interval of relay 3SRA. "Release" relay 2RL operates from ground through break contact 3SRA–1(2) and make contact 3CTR–1(2) and this is followed by return of all circuits to normal. The transfer is now cancelled and calls are received at station 12 in the normal manner.

Call Received On CF Line On Which Transfer Has Been Validated

Assuming now that an incoming call is received on the CF line after the transfer has been validated; relays 2CFLH, 2ON, 3D, 3TRA, and 3TR will be operated at this time and the crosspoints of SW1(A) and SW1(B) will be closed. Relay 2H operates and a short spurt of ringing is supplied to station 12. Ringing detector operates, the ringing is tripped and cut through relay 3CT operates from ground at make contact 2RD–1(3)

through the break contact of transfer pair 3D1–6(3) and, upon operating, locks to ground at make contact 2ON–6(3) through its own make contact 3CT–3(3).

Also, relay 2RS1 operates from the sleeve ground and closes at make contact 2RS1–5(2) a path connecting the winding of relay 2CFS (polarized) across the CF line circuit as a supervisory bridge. The terminal resistor 58 is removed from the regular line appearance at break contact 2RS1–2(3). Line relay 2L1 operates and the normal marker functions follow. HOLD relay 2HO operates from the sleeve ground and an originating register is connected to the CF line. Relay 2L1 releases as the line connections are open at break contacts 2HO–1(2) and 2HO–2(2).

Relay 2AS1 operates from the sleeve ground through break contact 3D1–5(2) and, upon operating, locks to the ground through its make contact 2AS1–2(2). The transmission path between the regular line appearance and the CF line is now open at break contacts 2AS1–4(2 and 2AS1–5(2). Relay 3D1 operates from ground at make contact 2AS1–3(3) through the break contact of its transfer pair 3D1–7(3) and upon operating, closes a holding path through the make contact of the same transfer pair (Make-before-break), make contact of transfer pair 3TR–11(3) and make contact 2RS1–6(3. With relay 3D1 operated, the transmission path between CF station 12 and the regular line appearance is open at the break contacts of transfer pairs 3D1–3(2 and 3D1–4(2). Also, the operate path of relay 2AS1 is open at break contact 3D1–5(2); relay 2AS1 is held through its make contact 2AS1–2(2) to the sleeve ground.

With cut-through relay 3CT operated as above described, pulsing circuit 3PLS is connected to the CF line circuit at the make contacts of respective transfer pairs 3CT–1(2) and 3CT–2(2) and the transfer number stored in CF memory 87 is pulsed to the originating register. Upon completion of pulsing, the normal marker functions follow and the CF line is connected through a CF 1A0 trunk (42, FIG. 1) or a CF junctor (43) to the transfer station.

Following normal call back functions, relays 2AS1, 3CT and 3PLS release and a transmission path is closed between the regular line appearance and the CF line with a supervisory bridge through the winding of relay 2CFS. The calling subscriber connected at the regular line appearance now hears audible ringing from the CF line.

Transfer Station Answers Forwarded Call

Now when the subscriber at the transfer station goes off-hook to answer the above call, the ringing is tripped and the transmission path is cut through between the transfer station and the CF line. Supervisory relay 2CFS operates on the polarity reversal and a path is closed at make contact 2CFS–1(3) connecting resistor 57 across the regular line appearance whereby the calling party will be charged for a call to CF station 12. CF station 12 is charged for a call to the transfer station in the manner described subsequently.

Conversation between the calling party and the CF subscriber or other person attending the transfer station now takes place.

Call Originated By CF Subscriber After Transfer Has Been Validated

As pointed out above, the novel arrangement contemplated by the invention is such that an outgoing call may be initiated from the CF station even after a transfer has been validated should occasion arise for doing so; it is unlikely, of course, that such occasions will be frequent. Relays 2ON, 3TRA, 3TR, 3D, 3CFMC, 3MON stand operated.

Now as the subscriber goes off-hook to initiate an outgoing call, line relay 2L operates through the closed loop and the normal marker functions follow. An originating register at the central office is connected to CF station 12 for recording the dial pulses as transmitted. Relay 2RS1 operates from the sleeve ground through break contact 3SDT–1(2) and this is followed by operation of CF register connector 2CFRC from ground at make contact 2ON–2(2), make contact 2RS1–7(2 and make contact of transfer pair 3TR–1(2); the CF register is now connected via make contacts 2CFRC–2(3) and 2CFRC–3(3) for recording dial pulses from CF station as transmitted.

HOLD relay 2H stands operated from the sleeve ground and relay 2L is released as the line connecting paths are open at respective break contacts 2H–2(2) and 2H–3(2). Now as a regular number is dialed, operations as previously described take place until, as the last digit is dialed, either steering relay 3HS or 3LS operates depending upon whether a seven-digit or a 10-digit number has been dialed. "Pulsing complete" relay 3PLC operates from ground at make contact 3RON–6(3), either make contact 3LS–1(3) and the make contact of transfer pair 3DD–2(3) or make contact 3HS–1(3) and the break contact of transfer pair 3DD–2(3) depending upon the number of digits dialed, make contact 2CFRC–10(3) and the break contact of transfer pair 2TM–4(3).

The originating register follows the dial pulses and following completion of dialing, the normal marker functions and call-back functions take place. HOLD relay 2H first releases and, following further call-back functions, reoperates.

Relays 2RS1, 2PDS and 2CFRC release, and the CF register releases momentarily. Following the further call-back functions, relays 2RS1, 2PDS and 2CFRC reoperate and the Cf register is reoperated and held until disconnect. (Since, as pointed out above, it is likely that the CF subscriber will initiate calls only infrequently after a transfer has been validated, the extra holding time for the CF register under this condition is not considered damaging.)

The connection is established through the CF link and CF circuit to the regular line appearance which is held busy to incoming calls under this condition.

When the call has been completed or abandoned and the CF subscriber goes on-hook, the CF register releases and the circuits return to the condition prevailing when the call was being initiated.

It will be obvious, of course, that calls will be initiated and/or responded to under specific conditions other than those described above. However, the operations involved will be similar in general to those described and it is believed that such operations will be apparent from the preceding description. In the event, for example, that the CF subscriber dials a "regular" number within 2 minutes of the attempt to establish a transfer, which transfer was not actually validated, relay 3SDT will stand released and relay 2RL will operate following call-back functions and circuits will return to normal following closing of CF station 12 through to the connection established through the switching network. (Initiation of the new call within 2 minutes without a second attempt to validate a transfer is taken to indicate that the transfer attempt has been abandoned for the moment.)

Charging CF Customer For Forwarded Calls

Obviously suitable means will be provided for charging the CF subscriber for incoming calls initially directed to his station but forwarded to the transfer station as described above. In the event that the call forwarding service is limited to the transfer of calls to stations in the local flat rate area by means of a class of service indication on the line appearances of the call forwarding circuits there will, of course, be no problem involved in charging for forwarded calls. However, if it be desired to permit transfer to stations outside of the local flat rate area, then it will be necessary to provide suitable charging arrangements to insure than any additional charge for the forwarded call is assessed to the CF subscriber. Since the forwarded call is made from the line appearance of the selectable CF circuit, it is necessary to determine for each specific call just which CF line was connected to the CF circuit at the moment.

Ordinarily in the instance of local automatic message accounting (LAMA) offices, the equipment location of each calling line is transmitted to the common control equipment, and this equipment location is utilized by an AMA translator to determine the directory number of the calling line. In accordance with the novel arrangement shown in FIG. 4 for use with the above-described call forwarding service, however, the equipment location code points of the CFC line circuits in the AMA translator are not cross-connected to give directory numbers but are so connected as to operate a multi-contact charge relay in the associated call forwarding circuit. Thus, each subscriber auxiliary line circuit, 131 (AO) to 132 (AX) will be provided with an additional lead through the call forwarding link which will appear on a respective charge relay contact, as make contacts 4CFCHO–1(4), 4CFCHX–1(4) in each call forwarding circuit of the full group of CF circuits 133 (CFO) to 134 (CFX). The "mate" contacts of the charge relays, as make contacts 4CFCHO–2(4) and 4CFCHX–2(4) and make contacts 4CFCHO–3(4) and 4CFCHX–3(4) will be cross-connected to the directory number translation in each AMA translator, as translators 137 (TX) and 139 (TO), to provide the directory number of the CF subscriber associated with the call forwarding circuit.

It will be understood that there will be one lead (corresponding to leads 141 and leads 142) for each CF circuit in a respective translator and, correspondingly, a code point, to which the respective leads are connected, for equipment locations of all CF circuits in the translator.

In the instance of telephone offices utilizing automatic number identification (ANI) or using message registers for charging each CF subscriber's auxiliary line, as 143, would have an additional relay, as 5TR, which would operate whenever a transfer is validated. The sleeve lead of the CF circuit, as 144, would be extended through the CF link, as 147, to the make contact of transfer pair 5TR–1(4) whereby to operate the message register of the CF subscriber or to activate the ANI identification terminal corresponding to that subscriber.

It is obvious that other methods of call charging may be utilized as dictated by the circumstances; this might involve modification of the common control equipment in some instances.

The obvious economically desirable features inherent in the novel call forwarding service arrangement contemplated by the invention have in part been set forth above. That is, for example, the fact that the call forwarding circuits and call forwarding memories are selectable on a preference basis from a relatively small group and are held only during the time the call forwarding line is actually in the transfer mode. Further, a novel and particularly efficient arrangement for providing the special tones is utilized whereby different similar situations may be met by use of a common tone source. For example, a single source of special dial tone is utilized by simple, efficient means both in connection with the initiation of a transfer and, subsequently, upon cancellation of the validated transfer condition. Similarly, the "OK" tone source is utilized both upon indication of a "match" of call numbers and during progress of the cancellation procedure.

While specific embodiments of the invention have been selected for detailed disclosure, the invention is not, of course, limited in its application to the embodiments disclosed. The embodiments which have been described should be taken as illustrative rather than restrictive thereof.

What is claimed is:

1. In a telephone communication system including a subscriber station and a regular line circuit for said station, means for providing call forwarding service for said subscriber station including an auxiliary line circuit connected between said subscriber station and said regular line circuit, a group of selectable call forwarding circuits, a call forwarding link circuit for connecting a selected one of said call forwarding circuits to said auxiliary line circuit and between said subscriber station and said regular line circuit on each originating call as the station goes off-hook, means effective upon dialing a first predetermined special number for initiating call transfer, means effective upon completion of the dialing of a regular number for disconnecting said selected call forwarding circuit, a group of selectable call forwarding registers, a group of selectable call forwarding memories, and means following connection of said selected call forwarding circuit for selecting and connecting to said call forwarding circuit a respective one of said registers and a respective one of said memories.

2. In a telephone communication system including a subscriber station and a regular line circuit for said subscriber station, the combination defined by claim 1 further characterized in means including a high impedance pulse detector connectable to said selected call forwarding circuit and effective as a number is dialed for causing registration of the digits in said respective one of said selectable call forwarding registers.

3. In a telephone communication system including a subscriber station and a regular line circuit for said station, the combination defined by claim 2 further characterized in additional means including a low resistance pulsing relay, and means for disconnecting said high impedance pulse detector means from said selected call forwarding circuit and for connecting said additional means thereto, said additional means also being effective as a number is dialed for causing registration of the digits in said respective one of said selectable call forwarding registers.

4. In a telephone communication system including a subscriber station and a regular line circuit for said station, the combination defined by claim 3 further characterized in means effective following the dialing of said first predetermined special number and completion of the dialing of a transfer number for causing the number registered in said respective one of said selectable call forwarding registers to be transferred to said respective one of said memories and stored therein for a predetermined time interval.

5. In a telephone communication system including a subscriber station and a regular line circuit for said station, the combination defined by claim 4 further characterized in means effective following response to a call to the transfer station by going off-hook and a return to on-hook condition at said subscriber station to validate a transfer condition whereby calls incoming to said subscriber station are forwarded to the transfer station.

6. In a telephone communication system including a subscriber station and a regular line circuit for said station, the combination defined by claim 5 further characterized in means effective following a failure to respond to the transfer call by the transfer station and upon redialing of said first predetermined special number and completion of the redialing of the transfer number before expiration of said predetermined time interval for comparing for possible match the number stored in said one of said memories and the number stored in the selected one of said call forwarding registers during the redialing of the transfer number, a first relay operated upon indication of a match between the two numbers, and a second relay operated upon indication of a failure of a match between the two numbers.

7. In a telephone communication system including a subscriber station and a regular line circuit for said station, the combination defined by claim 6 further characterized in a source of OK tone, a source of reorder tone, means effective upon operation of said first relay for connecting said source of OK tone to said selected call forwarding circuit and means effective upon operation of said second relay for connecting said source of reorder tone thereto.

8. In a telephone communication system including a subscriber station and a regular line circuit for said station, the combination defined by claim 7 further characterized in means effected by dialing a second predetermined special number differing from said first special number for cancelling a validated transfer condition, said last mentioned means including a third relay.

9. In a telephone communication system including a subscriber station and a regular line circuit for said station, the combination defined by claim 8 further characterized in that operation of said third relay is also effective to connect said source of OK tone to said selected call forwarding circuit.

10. In a telephone communication system including a subscriber station and a regular line circuit for said station, the combination defined by claim 9 further characterized by a source of special dial tone, a fourth relay effective upon operation to connect said source of special dial tone to said selected call forwarding circuit, and means following the dialing of said first predetermined special number for operating said fourth relay.

11. In a telephone communication system including a subscriber station and a regular line circuit for said station, the combination defined by claim 10 further characterized in additional means for operating said fourth relay, said additional means being effected by operation of said third relay.

12. In a telephone communication system including a subscriber station and a regular line circuit for said station, the combination defined by claim 11 further characterized in a release relay effective when operated to return operated elements of the call forwarding service providing means to normal condition, a first operating path and a second operating path for said release relay, means effected by operation of said fourth relay for opening the first of said operating paths, and additional means effected by operation of said third relay for closing the second of said paths.

* * * * *